United States Patent [19]

Carroll et al.

[11] Patent Number: 4,493,849
[45] Date of Patent: Jan. 15, 1985

[54] PROCESS FOR PREPARING A NON-CHALKY, ORGANOLEPTICALLY PLEASING CHEWING GUM COMPOSITION

[75] Inventors: Thomas J. Carroll, Astoria; Michael Rubin, West Nyack; Dominic J. Piccolo, Brooklyn, all of N.Y.; Michael Glass, Fairlawn, N.J.

[73] Assignee: Warner-Lambert Company, Morris Plains, N.J.

[21] Appl. No.: 544,330

[22] Filed: Oct. 21, 1983

[51] Int. Cl.³ .............................................. A23G 3/30
[52] U.S. Cl. ...................................... 426/3; 426/662; 426/289; 426/5
[58] Field of Search ......................... 426/3-6, 426/662, 289

[56] References Cited

U.S. PATENT DOCUMENTS

| | | | |
|---|---|---|---|
| 2,076,112 | 4/1937 | Barker | 426/3 |
| 3,011,949 | 12/1961 | Bilotti | 426/3 |
| 3,085,048 | 4/1963 | Bush | 426/3 |
| 3,655,866 | 4/1972 | Bilotti | 426/3 |
| 4,238,475 | 12/1980 | Witzel | 426/3 |
| 4,265,867 | 5/1981 | Caswell | 426/3 |

OTHER PUBLICATIONS

Andres, C., Ed. Dir., "Lecithin, A Multifunctional Ingredient," Food Processing, May 1983, pp. 113–115.

*Primary Examiner*—Jeanette M. Hunter
*Attorney, Agent, or Firm*—Daniel A. Scola, Jr.; Gary N. Nath

[57] ABSTRACT

The method of preparing a chewing gum comprising the steps of: (a) forming a premixture of lecithin and a dicalcium phosphate dihydrate-sugar and agglomeration such that the adherent film forming action of the lecithin coats the dicalcium phosphate dihydrate; (b) adding the premixture of (a) to a chewing gum composition; and (c) forming a chewing gum piece therefrom.

19 Claims, No Drawings

PROCESS FOR PREPARING A NON-CHALKY, ORGANOLEPTICALLY PLEASING CHEWING GUM COMPOSITION

The present invention relates to a method for preparing a non-chalky, organoleptically pleasant chewing gum composition and product produced thereby.

One of the problems associated with the addition of fillers to the gum portion of chewing gum compositions is the chalkiness and grittiness that they impart to the overall mouthfeel. The result is an organoleptically negative and unpleasant perception noticed by the gum chewer.

The instant invention is directed toward a unique process of solving chalkiness problems inherent in chewing gum compositions when standard fillers are added to the gum portion.

Dicalcium phosphate has been added to chewing gum compositions as an anticariogenic agent. U.S. Pat. No. 3,011,949, discloses chewing gum compositions containing solid powder fillers such as dicalcium phosphate, for the purpose of supplementing the supply of calcium and phosphate in saliva. This supplement helps to aid against tooth decay-producing acids that are produced and exist in the saliva. The patentee discloses the effectiveness of the dicalcium phosphate which is easily released from the chewing gum during mastication to provide this effect.

U.S. Pat. No. 3,655,866 disloses a releasable form of dicalcium phosphate prepared for sugarless chewing gum. The dicalcium phosphate is coated with a water-soluble polyol or mixture of polyols, for example, sorbitol, xylitol and mannitol, prior to incorporation of the mineral material into the chewing gum composition. The process of incorporating the dicalcium phosphate claimed by the patentee comprises the improvement of incorporating therein from about 10 to abut 40% by weight of polyol agglomerated dicalcium phosphate in the sugarless chewing gum product.

Another coating technique is taught in U.S. Pat. No. 3,085,048 which discloses an improved process for coating dicalcium phosphate with sugar such that the dicalcium phosphate will be gradually released into the saliva to contribute to an anticariogenic effect. The dicalcium phosphate is added to the gum composition and released slowly when the chewing gum is masticated.

U.S. Pat. No. 4,064,274 teaches that chewing gum bases containing calcium carbonate as a filler produce chewing gums which tend to lose their sweetness retention after a few weeks of storage.

It has been found that fillers in the gum base portion of the chewing gum composition do not give the chalky or gritty mouthfeel since they tend to be trapped in the gum base and are not substantially released upon mastication. When fillers, such as dicalcium phosphate dihydrate are used in the gum portion, as opposed to the gum base portion, of the chewing gum, the gritty mouthfeel is perceptible when masticated. Heretofore, there has not been a chewing gum process which has focused on the elimination of the gritty, chalky mouthfeel inherent when mineral fillers are used in the gum portion of chewing gum compositions. In particular, the art does not suggest the use of a premixture of a dicalcium phosphate dihydrate-sweetener agglomeration combination with lecithin as an additive to a chewing gum composition.

In applicants' copending application. U.S. Ser. No. 471,074, filed Mar. 1, 1983, entitled Dicalcium Phosphate as Gum Base Filler, the applicant discloses the advantage of incorporating dicalcium phosphate in the anhydrate form in a gum base to produce a better film-forming bubble gum, particularly in a food acid-containing chewing gum, i.e, a fruit flavor. One key to that invention was the incorporation of the filler into the gum base. The instant invention does not incorporate the dicalcium phosphate dihydrate into the gum base. Additionally, the instant process does not effectively work with the anhydrous form of the dicalcium phosphate.

The instant invention concerns an improved process of making a chewing gum composition whereby a premixed quantity of particulate lecithin in combination with an agglomeration of dicalcium phosphate dihydrate and sweetener is incorporated into the gum portion of the chewing gum composition. The applicant has discovered, quite surprisingly, that merely adding lecithin or dicalcium phoshpate dihydrate to the chewing gum composition individually does not remedy the unpleasant grittiness and chalkiness. The premixed combination is not added to the gum base per se but is homogeneously mixed into the gum portion in the traditional manner as other standard chewing gum ingredients after the gum base has been prepared.

In one embodiment, the instant process of making a nonchalky, organoleptically pleasant chewing gum composition comprises the steps of:

(a) forming a premix comprising particulate lecithin, present in the amount of about 2 to about 7%, and an agglomerated mixture of dicalcium phosphate dihydrate and a sweetener, said dicalcium phosphate dihydrate being present in the amount of about 50 to about 70% and said sweetener being present in the amount of about 25 to about 30%, all percents being based on the total weight of the premix;

(b) further mixing the premix of (a) with an effective amount of corn syrup, coloring agent and additional sweetener;

(c) mixing the resultant mixture of (b) with a gum base to obtain a homogeneous mass.

Without being bound by any one theory, it is believed that the relative polarities of the dicalcium phosphate dihydrate and lecithin provide attractive forces which assist the lecithin in coating the dicalcium phosphate dihydrate. The lecithin provides an adherent film forming action which binds and coats the filler. It is believed that this coating procedure aids in effectively masking the chalky mineral taste of the dicalcium phosphate dihydrate. Additionally, the paticulate lecithin provides the added advantages of an increased sensation of sweetness due to its creamy organoleptic characteristic. Thus, the net effect of the addition of the premix as described above is an increased perception of sweetness and a less chalky, less gritty mouthfeel.

It is important that the gum base does not directly coat the dicalcium phosphate dihydrate. This would be likely to cause binding of the dicalcium phosphate filler into the gum base and prevent proper release upon mastication.

The preparation of the premix is a two-step process, whereby the sweetener, which preferably is granulated sugar, is first combined with the dicalcium phosphate dihydrate in an aqueous slurry. The slurry is forced through a high pressure nozzle and the slurry material emerges as a dry agglomeration. This technique is well known to the art and is commonly called spray drying. The agglomeration of sugar and dicalcium phosphate dihydrate is then combined with particulate lecithin in a mixer and mixed at low speed to prevent fracturing of the agglomeration. The lecithin coats the agglomeration and in particular the dicalcium phosphate dihydrate portion of the agglomeration thereby forming what is referred to herein as the premix. The ratio of dicalcium phosphate dihydrate to sweetener, is about 80:20 and preferably about 70:30 parts by weight. Sugar is the preferred sweetener. As will be discussed later, the amount of dicalcium phosphate dihydrate in the premix is important as a non-cariogenic agent in a sugar chewing gum.

The instant invention also provides for the manufacture of a chewing gum product by the steps comprising (a) forming a premixture of lecithin and a dicalcium phosphate dihydrate-sugar agglomeration such that the lecithin binds and adheres to the agglomeration and more particularly to the dicalcium phosphate dihydrate portion of the agglomeration;

(b) adding the premixture of (a) to a chewing gum composition; and (c) shaping the resultant mixture into a chewing gum piece.

The instant process is designed to specifically allow and facilitate simultaneous release of the premixture of lecithin and dicalcium phosphate dihydrate-sweetener agglomeration upon mastication as a means of providing the perceptions of creaminess and sweetness without the negative chalky and gritty mouthfeel. It was discovered that the simple addition of the individual components of lecithin and dicalcium phosphate dihydrate into the chewing gum portion of the chewing gum formulation would not yield simultaneous release of these components for the simple reason that they would not be bound together and would therefore release at different rates. Additionally, simple addition of the individual components would not yield a non-chalky creamy mouthfeel perception since the lecithin and sweetener would not be intimately bound to the dicalcium dihydrate. In the instant process, the formation of the premix such that the dicalcium phosphate dihydrate can be effectively carried into the oral cavity without its unpleasant mouthfeel is critical to the making of the chewing gum composition. The process provides a means of making a non-cariogenic chewing gum composition which does not suffer the negative mouthfeel of the prior art compositions.

The lecithin used in the instant process should be of a high quality and purity, being substantially free from flavor off-notes or negative residual flavor. Ordinarily, particulate lecithin is available with a purity of 95% acetone insolubles which is suitable for the instant process. In particular, the brand "ALCOLEC F 100" is most effective in the process described herein (ALCOLEC is a trademark of American Lecithin Company). The instant process requires the lecithin to have a minimum purity of about 95% acetone insolubles and preferably about 97% acetone insolubles. The *Condensed Chemical Dictionary*, 9th edition, Van Nostrand Reinhold, 1977, defines lecithin as mixtures of diglycerides of fatty acids linked to the choline ester of phosphoric acid. Lecithins are classed as phosphoglycerides or phosphatides. In the instant invention, the lecithin must have a minimum of about 95% by weight of phosphatide present. This purity level is generally designated in commercially available lecithins as "95% acetone insolubles." The phrase "95% acetone insolubles" is intended to mean that upon dissolution of the lecithin in acetone, 95% of the lecithin (the phosphatide portion) remains insoluble. Residual impurities such as oil, moisture and soluble non-phosphatides account for the 5% of the materials dissolved and extracted by the acetone.

The instant invention requires lecithin to have a purity level of about 95% acetone insolubles and preferably about 97% acetone insolubles. In the most preferred embodiment, the purity level is 96.8% acetone insolubles.

While lecithin is well known in the art as an emulsifier or softener in chewing gum compositions, it has not been used in combination with the dihydrate form of dicalcium phosphate in the manner described herein. The instant process uses an agglomerated sweetener in the premix to aid in the simultaneous release of the lecithin and the dicalcium phosphate dihydrate. The sweetener helps to carry the other components as it is dissolved in the oral cavity.

In preparing the formulation for use in the instant process, the sweeteners and bulking agents traditionally added to the gum portion of the chewing gum composition may be mixed with the gum base prior to the addition of the premix. The gum base thus becomes saturated and bound by the sweeteners and bulking agents and will be unlikely to absorb the premix. In this manner, migration of the premix into the gum base will be precluded, thereby preventing the premix components from becoming locked into the gum base.

The premix, as mentioned above, comprises lecithin and an agglomerated mixture of dicalcium phosphate dihydrate and sweetener. The particulate lecithin is present preferably in the amount of about 0.1 to about 0.5% by weight of the total chewing gum composition and most preferably in the amount of about 0.35 to about 0.38%.

The most preferred range of particulate lecithin is about 0.2 to about 0.3% by weight of the final chewing gum composition. The most preferred amount is 0.28% by weight of the final chewing gum composition.

The relative amounts of particulate lecithin and dicalcium phosphate dihydrate are critical to the instant invention. Too much lecithin in the premix would adversely affect various properties of the chewing gum, such as chew and texture, due to the softening and emulsifying effect of lecithin. Similarly, if not enough particulate lecithin is used in the premix, the advantages of the instant invention, e.g. non-chalkiness, non-grittiness, creaminess etc., are not perceived.

The dicalcium phosphate dihydrate is present in the premix in amounts such that when the final chewing gum product is masticated, the amount of dicalcium phosphate dihydrate released relative to the available carbohydrates released is about 6.4%. Thus, for example, in a sugar chewing gum, the amount of dicalcium phosphate dihydrate needed to provide a prophylactic measure against the cariogenic properties of the sugar is about 6.4% of dicalcium phosphate dihydrate based on the weight of the sugar.

The sweetener present in the premix is preferably sugar, but may also be selected from a wide range of materials including water-soluble agents, water-soluble artificial sweeteners, polyols and dipeptide based sweeteners or combinations thereof. Whichever sweetener or mixture of sweeteners are chosen they should provide adequate bulk to allow for proper processing when combined with the other chewing gum ingredients and should provide adequate means of transporting the lecithin and dicalcium phosphate dihydrate into the saliva upon mastication.

Particular representative sweeteners in addition to sugar are illustrated below but are not intended to be a limitation on the scope of the useful sweetener that can be employed.

A. Water-soluble sweetening agents such as monosaccharides, disaccharides, and polysaccharides such as xylose, ribose, glucose, mannose, galactose, fructose, dextrose, sucrose, sugar, maltose, partially hydrolyzed starch or corn syrup solids and sugar alcohols such as sorbitol, xylitol, mannitol and mixtures thereof.

B. Water-soluble artificial sweeteners such as the soluble saccharine salts, i.e., sodium or calcium saccharin salts, cyclamate salts, acesulfame-K and the like, and the free acid form of saccharin.

C. Dipeptide based sweeteners such as L-aspartyl-L-phenylalanine methyl ester and material described in U.S. Pat. No. 3,492,131 and the like.

The water-soluble sweeteners described in category A above, are preferably used in amounts of about 25% to about 75% by weight and most preferably from about 50% to about 65% by weight of the final chewing gum composition. In contrast, the artificial sweeteners described in categories B and C are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils.

The gum base used in this invention may be any water-insoluble gum base well known in the art. Illustrative examples of suitable polymers in gum bases include both natural and synthetic elastomers and rubbers. For example, those polymers which are suitable in gum bases, include, without limitation, substances of vegetable origin such as chicle, jelutong, balata, gutta percha, lechi caspi, sorva, crown gum and mixtures thereof. Synthetic elastomers such as butadiene-styrene copolymers, isobutylene-isoprene copolymers, polyethylene, polyisobutylene, polyvinylacetate and mixtures thereof, are particularly useful.

The amount of gum base employed will vary greatly depending on various factors such as the type of base used, consistency desired and other components used to make the final product. In general, amounts of about 5% to about 45% by weight of the final chewing gum composition are acceptable for use in chewing gum compositions with preferred amounts of about 15% to about 25% by weight.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include pentaerythritol ester or partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin, and partially hydrogenated methyl ester of rosin and mixtures thereof. The solvent may be employed in an amount ranging from about 10% to about 75% and preferably about 45% to about 70% by weight of the gum base.

A variety of traditional ingredients used as plasticizers or softeners such as lanolin, stearic acid, sodium stearate, potassium stearate, glyceryl triacetate, glycerine and the like, may also be incorporated into the gum base to obtain a variety of desirable textures and consistency properties. These additional materials are generally employed in the amounts of up to about 30% by weight and preferably in amounts of from about 3% to about 7% by weight of the final gum base composition.

Flavoring agents well known to the chewing gum art may be added to the chewing gum compositions of the instant invention. These flavoring agents may be chosen from synthetic flavor oils, flavorings and/or oils derived from plants, leaves, flowers, fruits and so forth, and combinations thereof. Representative flavor oils include: spearmint oil, cinnamon oil, oil of wintergreen (methylsalicylate) and peppermint oils as well as their flavoring replacements. Also useful are artificial, natural or synthetic fruit flavors such as citrus oil including lemon, orange, grape, lime and grapefruit and fruit essences including apple, strawberry, cherry, pineapple and so forth. Other fruit flavors well known to the art are also employable.

The amount of flavoring agent employed is normally a matter of preference subject to such factors as flavor type, base type and strength desired. In general, amounts of about 0.05% to about 3.0% by weight of the final chewing gum composition are useable with amounts of about 0.3% to about 1.5% being preferred and about 0.7% to about 1.2% being most preferred.

The chewing gum composition of this invention may additionally include the conventional additives of coloring agents such as titanium dioxide; additional fillers such as aluminum hydroxide, alumina, aluminum silicates: gum base fillers such as talc and calcium carbonate and combinations thereof; and additional emulsifiers such as glycerol monostearate. The amount of filler in the gum base should remain within the range of about 10 to about 25% by weight of the gum base. Total filler in chewing gums made by the instant process, including the dicalcium phosphate dihydrate and the filler in the gum base, should be about 7 to about 15% by weight of the final chewing gum composition. By varying the type and amount of additional fillers, the chew characteristics and texture can be varied as desired.

The chewing gum compositions made from the instant process may be of the sugar or sugarless variety and may be formulated into regular or non-adhering chewing gum pieces. Bubble gum, stick gum, center-filled and other gum piece forms well known to the art are contemplated.

In general, the process of preparing chewing gum compositions comprises adding to a suitable gum kettle a melted blend of gum base and corn syrup and mixing until homogenous. Usually a homogeneous mass is obtained in about six (6) minutes at a temperature of about 55° to about 65° C. Sugar, dextrose, malto dextrin and color are then blended into the homogeneous mass for approximately two (2) minutes. Flavor is added next and mixed until sufficiently homogeneous. In the instant process, the addition of the premix described above would be the next step and final mixing would then be carried out, during which time glycerin may be added.

The following examples serve to provide further appreciation of the invention but are not meant in any way to restrict the effective scope of the invention. All percentages throughout the specification are by weight % of the final composition unless otherwise indicated.

EXAMPLE I

A premix is formed, using the two-step process described above, having particulate lecithin, dicalcium phosphate dihydrate and sugar in the respective amounts of about 0.35%, 0.77% and 3.33% by weight of the total chewing gum composition. Into a suitable gum kettle a melted blend of gum base and corn syrup are added in the respective amounts of about 23.3% and 17.00% by weight of the total chewing gum composition. This blend is mixed for about six (6) minutes to form a homogeneous mass at a temperature of about 55°-65° C. To this is added sugar, in the amount of about 47%, dextrose in the amount of about 6%, malto dextrin in the amount of about 0.75% and color in the amount of about 0.1%, all percents being based on the weight of the total chewing gum composition. Spearmint flavor is then added in the amount of about 0.95% and mixing continued for about two (2) minutes. The premix is added next and mixing is continued until the total mixture is sufficiently homogeneous. Glycerin in the amount of about 0.45% is added to complete the addition of ingredients. The final temperature of the chewing gum composition is between about 43° to about 48° C.

Chewing gum pieces were formed using this process and an expert test panel was conducted to evaluate various sensory attributes of the chewing gum. Most notably the panelists focused on the attributes of creaminess, non-chalkiness, sweetness, juiciness and smooth mouthfeel.

The purpose of this example is to demonstrate the effectiveness of the instant process, which utilizes the novel step of forming the premix using particulate lecithin, over the prior art process which added a low purity lecithin paste and/or dicalcium phosphate dihydrate separately into the chewing gum composition.

As a control, a chewing gum composition was prepared without the premix, using the low purity lecithin paste of the prior art and dicalcium phosphate dihydrate as individually added ingredients. The amounts of all the ingredients were identical to those of the instant invention. The process used in making the control compositions was that standard to prior art gum making. Thus, a dicalcium phosphate dihydrate-sugar agglomeration was added individually to the chewing gum composition as is common to the art. A paste lecithin, with a purity of about 65% acetone insolubles was used as representative of the type commonly used in the art, instead of particulate, high purity lecithin. The paste lecithin was added separately from the dicalcium phosphate dihydrate-sugar agglomeration, along with the corn syrup and the gum base.

The panelists were trained experts in the evaluation of chewing gum compositions and each rated nine (9) specimens of gum formed by the instant process and nine (9) from the prior art process. The sensory attributes were rated after 0, 5 and 10 chews and at 2, 5, 7 and 10 minutes of chewing.

The panelists rated the chewing gum formed from the instant process significantly higher in creaminess, non-chalkiness, sweetness, juiciness and smoothness of mouthfeel than the prior art process.

This example clearly demonstrates that to overcome the negative mouthfeel of non-cariogenic dicalcium phosphate dihydrate-containing chewing gums, it is necessary that the applicant's process of forming the premix be performed. It is apparent from the above panel results that merely adding the prior art lecithin, which had a low purity and was in a paste form, to a chewing gum composition containing dicalcium phosphate dihydrate, did not effectively mask the gritty and chalky perception caused by the dicalcium phosphate dihydrate. A particulate, high purity lecithin is required to achieve the premix of the instant invention. Merely adding any form of lecithin individually to the composition will not mask the chalky mouthfeel.

EXAMPLE II

The novel process of Example I was followed using the following formulation to form a stick gum:

| Ingredient | % by weight of total composition |
| --- | --- |
| *premix | 11.4 |
| gum base | 20.6 |
| sugar | 42.6 |
| corn syrup | 17.0 |
| dextrose | 6.0 |
| glycerin | 0.5 |
| color | 0.1 |
| flavor | 1.5 |
| maltodextrin | 0.3 |
| | 100.0 |

*mixture of lecithin, dicalcium phosphate dihydrate-sugar agglomeration in the respective amounts of about 0.38% 7.7% and 3.33% by weight of the total composition.

A stick chewing gum piece was formed which had a creamy, non-chalky mouthfeel when masticated. This gum piece was rated by the expert panelists in the same manner as Example I and with the same results.

EXAMPLE III

The process of Example I was followed in making a bubble gum having the formulation below. The bubble gum exhibited an organoleptically pleasant, nonchalky mouthfeel when masticated and was rated superior in these sensory attributes by the expert panel following the method described in Example I.

| Ingredient | % by weight of total composition |
| --- | --- |
| *premix | 12.5 |
| gum base | 17.0 |
| corn syrup | 22.0 |
| sugar | 45.0 |
| color | 2.0 |
| glycerin | 0.6 |
| malic acid/citric acid flavor | 0.8 |
| | 100.0 |

*mixture of lecithin, dicalcium phosphate dihydrate-sugar agglomeration in the respective amounts of about 0.38%, 8.48% and 3.64% by weight of the chewing gum composition.

The invention being thus described, it will be obvious that the same may be varied in many ways. Such variations are not to be regarded as a departure from the spirit and scope of the invention and all such modifications are intended to be included within the scope of the claims.

We claim:

1. The process of making a non-chalky organoleptically pleasant chewing gum composition which comprises:

(a) forming a premix comprising particulate lecithin present in the amount of about 2 to about 7%, and an agglomerated mixture of dicalcium phosphate dihydrate and a sweetener, said dicalcium phosphate dihydrate being present in the amount of about 50 to about 70% and said sweetener being present in the amount of about 25 to about 30%, all percents being based on the total weight of the premix;

(b) mixing the premix of (a) with an effective amount of corn syrup, coloring agent and additional sweetener;

(c) further mixing the resultant mixture of (b) with a gum base to obtain a homogeneous mass.

2. The process of claim 1 wherein the sweetener is sugar.

3. The process of claim 2 wherein the particulate lecithin is of a high purity being substantially free from perceptible off-flavor notes and having at least 95% acetone insolubles.

4. The process of claim 1 wherein the ratio of dicalcium phosphate dihydrate to the sweetener is about 70 to about 30 parts by weight of the agglomerated mixture.

5. The process of claim 1 wherein the lecithin and the agglomerated mixture of dicalcium phosphate dihydrate and sweetener are combined in the premix such that the adherent film forming action of the lecithin coats the dicalcium phosphate dihydrate.

6. The process of claim 2 wherein the dicalcium phosphate dihydrate is present in an amount effective to provide a non-cariogenic effect.

7. The process of claim 2 wherein the particulate lecithin is present in the amount of about 0.2 to about 0.3% by weight of the final chewing gum composition.

8. The process of claim 2 wherein the gum base comprises a natural or synthetic rubber.

9. The process of claim 8 wherein the natural or synthetic rubber is selected from the group consisting of chicle, jelutong, balata, gutta-percha, lechi caspi, sorva and mixtures thereof.

10. The process of claim 8 wherein the synthetic rubber is selected from the group consisting of butadiene-styrene copolymers, polyisobutylene, isobutylene-isoprene copolymers and mixtures thereof.

11. The process of claim 3 wherein the sweetening agent is selected from the group consisting of water-soluble sweetening agents, water-soluble artificial sweeteners, dipeptide based sweeteners and mixtures thereof.

12. The process of claim 3 wherein there is present a material selected from the group consisting of plasticizers, flavoring agents, additional fillers and emulsifiers and mixtures thereof.

13. The process of claim 12 wherein the flavoring agent is selected from the group consisting of spearmint oil, cinnamon oil, oil of wintergreen (methylsalicylate), lemon oil, orange oil, grape flavor, lime oil, grapefruit oil, apple essence, strawberry essence, cherry essence, pineapple essence and a citrus combination.

14. A process of claim 12 wherein the flavoring agent is an artificial flavor selected from the group consisting of spearmint, cinnamon, wintergreen, lemon, lime, orange, grape, grapefruit, apple, strawberry, cherry and pineapple flavors and a combination thereof.

15. The process of making a non-cariogenic, non-chalky organoleptically pleasant chewing gum composition which comprises:

(a) forming a premix comprising particulate lecithin present in the amount of about 0.28% and an agglomerated mixture of dicalcium phosphate dihydrate and sugar, said dicalcium phosphate dihydrate being present in the amount of about 0.77% and the sugar being present in the amount of about 3.33%, all percents being based on the total weight of the premix;

(b) mixing the premix of (a) with an effective amount of corn syrup, coloring agent and additional sweetener;

(c) further mixing the resultant mixture of (b) with a gum base to obtain a homogeneous mass.

16. The process of claim 15 wherein the ratio of dicalcium phosphate dihydrate to sugar is 70:30 parts by weight of the agglomerated mixture.

17. The process of claim 16 wherein the purity of the lecithin is at least 95% acetone insolubles.

18. A method of preparing a chewing gum which comprises:

(a) forming a premixture of lecithin and a dicalcium phosphate dihydrate-sugar agglomeration such that the adherent film forming action of the lecithin coats the dicalcium phosphate dihydrate;

(b) adding the premixture of (a) to a chewing gum composition; and (c) forming a chewing gum piece therefrom.

19. A chewing gum product formed by the steps comprising:

(a) forming a premixture of lecithin and a dicalcium phosphate dihydrate-sugar agglomeration such that the lecithin binds to the dicalcium phosphate dihydrate;

(b) adding the premixture of (a) to a chewing gum composition; and (c) shaping the resultant mixture into a chewing gum piece.

* * * * *